(12) United States Patent
Slinger

(10) Patent No.: US 8,035,085 B2
(45) Date of Patent: Oct. 11, 2011

(54) CODED APERTURE IMAGING SYSTEM

(75) Inventor: Christopher William Slinger, Malvern (GB)

(73) Assignee: Qinetiq Limited, London (GB)

( * ) Notice: Subject to any disclaimer, the term of this patent is extended or adjusted under 35 U.S.C. 154(b) by 138 days.

(21) Appl. No.: 12/278,470

(22) PCT Filed: Feb. 6, 2007

(86) PCT No.: PCT/GB2007/000405
§ 371 (c)(1),
(2), (4) Date: Aug. 6, 2008

(87) PCT Pub. No.: WO2007/091047
PCT Pub. Date: Aug. 16, 2007

(65) Prior Publication Data
US 2009/0016481 A1    Jan. 15, 2009

(30) Foreign Application Priority Data
Feb. 6, 2006  (GB) .................................. 0602376.6

(51) Int. Cl.
*G01N 23/00* (2006.01)

(52) U.S. Cl. ............................................... 250/363.06
(58) Field of Classification Search .............. 250/363.06
See application file for complete search history.

(56) References Cited

U.S. PATENT DOCUMENTS

| | | | |
|---|---|---|---|
| 3,860,821 A | 1/1975 | Barrett | |
| 3,961,191 A | 6/1976 | Stoner et al. | |
| 4,075,483 A | 2/1978 | Tancrell et al. | |
| 4,092,540 A | 5/1978 | Barrett | |
| 4,165,462 A | 8/1979 | Macovski et al. | |
| 4,209,780 A | 6/1980 | Fenimore et al. | |
| 4,954,789 A | 9/1990 | Sampsell | |
| 5,047,822 A | 9/1991 | Little et al. | |
| 5,115,335 A | 5/1992 | Soref | |
| 5,294,971 A | 3/1994 | Braunecker et al. | |

(Continued)

FOREIGN PATENT DOCUMENTS

DE    25 28 641 A1    1/1976

(Continued)

OTHER PUBLICATIONS

Rocchia et al. A multiplex imaging spectrometer for low energy x-ray astronomy, Astrophysics and Space Science vol. 96, No. 2 (Oct. 1983), pp. 361-374.*

(Continued)

*Primary Examiner* — David Porta
*Assistant Examiner* — Shun Lee
(74) *Attorney, Agent, or Firm* — Oliff & Berridge PLC

(57) ABSTRACT

This invention relates to a coded aperture imaging system wherein a detector array is arranged to receive radiation from a scene via a coded aperture mask. The coded aperture mask provides a plurality of uncorrelated coded aperture arrays at different positions on the mask. Each distinct coded aperture array therefore passes coded information to the detector array. The intensity pattern at the detector array, which is a summation of the intensity patterns from each of the distinct coded aperture arrays, can be decoded separately for each coded aperture array to reconstruct a separate image associated with each coded aperture array. In this way the present invention teaches a coded aperture array means with multiple, simultaneous fields of view. The different fields of view can be different sizes and/or resolutions. Preferably the coded aperture mask is reconfigurable.

11 Claims, 4 Drawing Sheets

U.S. PATENT DOCUMENTS

Figure 1:
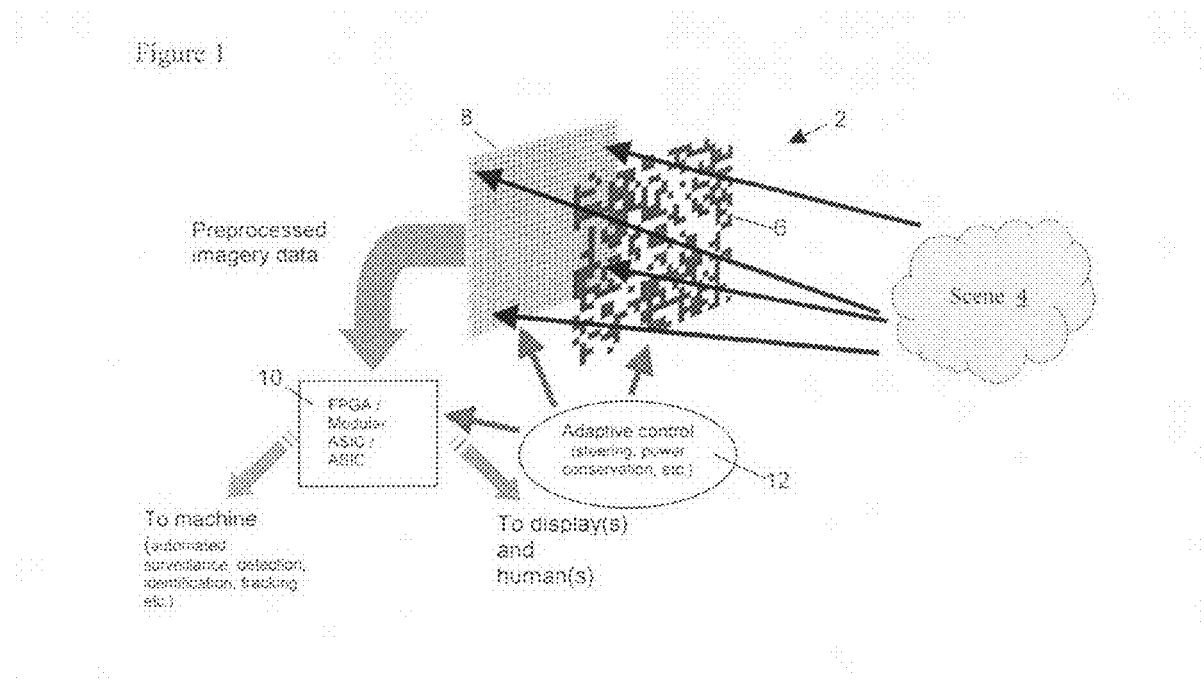

| | | | |
|---|---|---|---|
| 5,311,360 A | 5/1994 | Bloom et al. | |
| 5,426,312 A | 6/1995 | Whitehead | |
| 5,448,395 A | 9/1995 | Lopez et al. | |
| 5,488,504 A | 1/1996 | Worchesky et al. | |
| 5,500,761 A | 3/1996 | Goossen et al. | |
| 5,519,529 A | 5/1996 | Ahearn et al. | |
| 5,552,912 A | 9/1996 | Sharp et al. | |
| 5,579,149 A | 11/1996 | Moret et al. | |
| 5,636,001 A | 6/1997 | Collier | |
| 5,636,052 A | 6/1997 | Arney et al. | |
| 5,710,656 A | 1/1998 | Goossen | |
| 5,772,598 A | 6/1998 | Halling | |
| 5,784,189 A | 7/1998 | Bozler et al. | |
| 5,825,528 A | 10/1998 | Goossen | |
| 5,838,484 A | 11/1998 | Goossen | |
| 5,841,579 A | 11/1998 | Bloom et al. | |
| 5,870,221 A | 2/1999 | Goossen | |
| 5,943,155 A | 8/1999 | Goossen | |
| 5,949,571 A | 9/1999 | Goossen et al. | |
| 5,953,161 A | 9/1999 | Troxell et al. | |
| 5,995,251 A | 11/1999 | Hesselink et al. | |
| 6,034,807 A | 3/2000 | Little et al. | |
| 6,069,361 A | 5/2000 | Rubinstein | |
| 6,195,412 B1 * | 2/2001 | Tobin et al. | 378/87 |
| 6,324,192 B1 | 11/2001 | Tayebati | |
| 6,329,967 B1 | 12/2001 | Little et al. | |
| 6,392,235 B1 | 5/2002 | Barrett et al. | |
| 6,396,976 B1 | 5/2002 | Little et al. | |
| 6,424,450 B1 | 7/2002 | Goossen | |
| 6,430,333 B1 | 8/2002 | Little et al. | |
| 6,467,879 B1 | 10/2002 | Kubby et al. | |
| 6,519,073 B1 | 2/2003 | Goossen | |
| 6,570,143 B1 | 5/2003 | Neil et al. | |
| 6,737,652 B2 | 5/2004 | Lanza et al. | |
| 6,819,463 B2 | 11/2004 | Noonan | |
| 6,819,466 B2 | 11/2004 | Tayebati | |
| 6,856,449 B2 | 2/2005 | Winkler et al. | |
| 7,006,132 B2 | 2/2006 | Pereira et al. | |
| 7,031,577 B2 | 4/2006 | Painter et al. | |
| 7,235,773 B1 * | 6/2007 | Newman | 250/214 C |
| 7,251,396 B2 | 7/2007 | Larochelle et al. | |
| 7,415,049 B2 | 8/2008 | Flanders et al. | |
| 2002/0075990 A1 | 6/2002 | Lanza et al. | |
| 2003/0058520 A1 | 3/2003 | Yu et al. | |
| 2003/0122955 A1 | 7/2003 | Neidrich | |
| 2003/0164814 A1 | 9/2003 | Starkweather et al. | |
| 2003/0191394 A1 | 10/2003 | Simon et al. | |
| 2004/0008397 A1 | 1/2004 | Noonan | |
| 2004/0046123 A1 | 3/2004 | Dausch | |
| 2005/0057793 A1 | 3/2005 | Starkweather et al. | |
| 2005/0248827 A1 | 11/2005 | Starkweather et al. | |
| 2006/0038705 A1 | 2/2006 | Brady et al. | |
| 2006/0157640 A1 | 7/2006 | Perlman et al. | |
| 2007/0013999 A1 | 1/2007 | Marks et al. | |
| 2007/0091051 A1 | 4/2007 | Shen | |
| 2008/0128625 A1 | 6/2008 | Lamadie et al. | |
| 2008/0151391 A1 | 6/2008 | Zalevsky et al. | |
| 2008/0259354 A1 | 10/2008 | Gharib et al. | |
| 2008/0285034 A1 | 11/2008 | Gharib et al. | |
| 2009/0008565 A1 | 1/2009 | Gottesman | |
| 2009/0020714 A1 * | 1/2009 | Slinger | 250/550 |
| 2009/0022410 A1 * | 1/2009 | Haskell | 382/238 |
| 2009/0090868 A1 * | 4/2009 | Payne | 250/363.06 |
| 2009/0167922 A1 | 7/2009 | Perlman et al. | |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| GB | 1 449 636 | 9/1976 |
| GB | 2314664 | 1/1998 |
| GB | 2 414 881 A | 12/2005 |
| GB | 2 418 028 A | 3/2006 |
| GB | 2 434 935 A | 8/2007 |
| JP | A-55-146411 | 11/1980 |
| JP | A-58-060723 | 4/1983 |
| JP | A-04-005620 | 1/1992 |
| JP | A-09-113819 | 5/1997 |
| JP | A-2003-4441 | 1/2003 |
| WO | WO 91/12502 A1 | 8/1991 |
| WO | WO 94/18582 A1 | 8/1994 |
| WO | WO 96/24032 A1 | 8/1996 |
| WO | WO 97/26557 | 7/1997 |
| WO | WO 98/46007 A1 | 10/1998 |
| WO | WO 99/46768 | 9/1999 |
| WO | WO 00/17810 A1 | 3/2000 |
| WO | WO 00/45608 A1 | 8/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

Grindley et al. Optimizing wide-field coded aperture imaging: radial mask holes and scanning, Proceedings of the SPIE vol. 5168, No. 1 (2004), pp. 402-410, San Diego, CA, USA, Aug. 4-7, 2003.*

Meng et al. A gamma ray imager using clustered non-redundant array coded aperture, 2003 IEEE Nuclear Science Symposium Conference Record, vol. 2 (Oct. 2003), pp. 763-766.*

Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Conf. 28, pp. 741-748, (XP 000533631).

Casasent et al., "Real-time deformation invariant optical pattern recognition using coordinate transformations," *Applied Optics*, Mar. 1, 1987, pp. 938-942, vol. 26, No. 5, Optical Society of America, (XP 000601745).

Gmar et al., "Development of Coded-Aperture Imaging With a Compact Gamma Camera," *IEEE Transactions on Nuclear Science*, Aug. 2004, pp. 1682-1687, vol. 51, No. 4, IEEE, (XP 002366988).

Busboom et al., "Coded aperture imaging with multiple measurements," *J. Opt. Soc. Am. A*, May 1997, pp. 1058-1065, vol. 14, No. 5, Optical Society of America, (XP 002431989).

Mertz et al., "Fresnet Transformations of Images," *Proceedings of the Conference on Optical Instruments and Techniques*, London 1961, Ed. K.J. Habel, 1961, pp. 305-312, (XP 002432814).

Graziani et al., "Localization of GRBs by Bayesian Analysis of Data from the HETE WXM," AIP Conference Proceedings AIP USA, 2003, No. 662, (XP 002467862).

Graziani et al., "Determination of X-Ray Transient Source Positions by Bayesian Analysis of Coded Aperture Data," Oct. 8, 1997, pp. 1-6, (XP 002467863).

Gopinathan et al., "Coded apertures for efficient pyroelectric motion tracking," *Optics Express*, Sep. 8, 2003, vol. 11, No. 18, pp. 2142-2152, (XP 002467864).

Goossen et al., "Silicon Modulator Based on Mechanically-Active Anti-Reflection Layer with 1 Mbit/sec Capability for Fiber-in-the-loop Applications," *IEEE: Photonics Technology Letters*, Sep. 1994, pp. 1119-1121, vol. 6, No. 9, IEEE, (XP 000468079).

Accorsi et al., "High-Sensitivity Dynamic Coded Aperture Imaging," *2003 IEEE Nuclear Science Symposium Conference Record*, vol. 5 of 5, Oct. 19, 2003, pp. 1833-1837, vol. 13, IEEE.

Brown, "Multiplex imaging with multiple-pinhole cameras," *Journal of Applied Physics*., Apr. 1974, pp. 1806-1811, vol. 45, No. 4, American Institute of Physics.

Monnelly et al., "HETE Soft X-ray Camera Imaging: Calibration, Performance, and Sensitivity," *AIP Conference Proc.*, 2003, pp. 49-55, American Institute of Physics.

Wood et al., "Hybrid optics in dual waveband infrared systems," *Proc of. SPIE*, 1998, pp. 602-613, vol. 3482.

Fish et al., "Scanning singular-value-decomposition method for restoration of images with space-variant blur," *J. Opt. Soc. Am. A*, Mar. 1996, pp. 464-469, vol. 13, No. 3, Optical Society of America.

Lewis et al., "Micromachined Modulator Arrays for Use in Free-Space Optical Communication Systems," *Advanced Free-Space Optical Communications Techniques and Technologies, Proc of. SPIE*, vol. 5614, pp. 24-30, 2004.

Moseley et al., "Microshutters Arrays for the JWST Near Infrared Spectrograph," *Proceedings SPIE, International Society for Optical Engineering*, 2004, vol. 5487, Part 2, pp. 645-652.

Kutyrev et al., "Programmable Microshutter Arrays for the JWST NIRSpec: Optical Performance," *IEEE Journal of Selected Topics in Quantum Electronics*, May/Jun. 2004, vol. 10, No. 3, pp. 652-661.

De Villiers et al.; "Positive solutions to linear inverse problems," *Inverse Problems*, 1999, pp. 615-635, vol. 15, IOP Publishing Ltd.

U.S. Appl. No. 60/726,655, filed Oct. 17, 2005 in the name of David Brady.

U.S. Appl. No. 12/278,528, filed Aug. 6, 2008 in the name of Douglas Payne.

U.S. Appl. No. 12/278,515, filed Aug. 6, 2008 in the name of Philip Haskell.

U.S. Appl. No. 12/278,500, filed Aug. 6, 2008 in the name of Mark McNie et al.

U.S. Appl. No. 12/278,521, filed Aug. 6, 2008 in the name of Christopher Slinger.

U.S. Appl. No. 12/278,524, filed Aug. 6, 2008 in the name of Christopher Slinger et al.

U.S. Appl. No. 12/373,946, filed Jan. 15, 2009 in the name of Malcolm Strens.

Ivanov, O.P., "Control and image decoding software for portable gamma-ray imaging system with coded aperture", Oct. 1999, Nuclear Science Symposium 1999. Conference Record. 1999 IEEE, vol. 1, pp. 459-463.

Aug. 26, 2009 Office Action issued in U.S. Appl. No. 12/278,528.

May 7, 2010 Office Action issued in U.S. Appl. No. 11/920,345.

Fenimore et al.; "Coded aperture imaging with uniformly redundant arrays"; *Applied Optics*; Feb. 1, 1978; pp. 337-347; vol. 17, No. 3; Optical Society of America.

Cannon et al.; "Tomographical imaging using uniformly redundant arrays"; *Applied Optics*; Apr. 1, 1979; pp. 1052-1057; vol. 18, No. 7; Optical Society of America.

Tam et al.; "Spatial-light-modulator-based electro-optical imaging system"; *Applied Optics*; Feb. 10, 1992; pp. 578-580; vol. 31, No. 5; Optical Society of America.

Sun et al.; "Method for reduction of background artifacts of images in scanning holography with a Fresnel-zone-plate coded aperture"; *Applied Optics*; Jul. 20, 2004; pp. 4214-4218; vol. 43, No. 21; Optical Society of America.

International Search Report for PCT/GB2006/001890 mailed Aug. 28, 2006.

GB Search Reports for Application No. 0510470.8 dated Aug. 16, 2005, Nov. 8, 2005 and Nov. 10, 2005.

Aug. 31, 2010 Office Action issued in U.S. Appl. No. 12/278,528.

U.S. Appl. No. 60/792,335, filed Oct. 17, 2005 in the name of David Brady.

Bertero et al., "image Restoration Methods for the Large Binocular Telescope (LBT)," Astronomy and Astrophysics, May 30, 2000, pp. 1-15.

Cannon et al., "Coded Aperture Imaging: Many Holes Make Light Work," Optical Engineering, May/Jun. 1980, vol. 19, No. 3, pp. 283-289, (XP-001092857).

De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).

Gutin et al., "Agile, Detecting and Discriminating, infrared Electo-optical System (ADDIOS) Application to Coded Aperture Imaging and Non-Imaging Sensor Systems," Proc. of SPIE, 2007, vol. 6714, pp. 671406-1 to 671406-12, (Sep. 2007) (XP-002558346).

Mohan et al., "Sensing Increased Image Resolution Using Aperture Masks," CVPR, 2008, pp. 1-8, (Jun. 23, 2008) (XP-31297391).

Slinger et al., "Coded Aperture Systems as Nonconventional, Lensless Imagers for the Visible and Infrared," Proc. of SPIE, 2007, vol. 6737, pp. 67370D-1 to 67370D-10, (Oct. 2007) (XP-002558347).

Dec. 23, 2009 International Search Report issued in corresponding International Application No. PCT/GB2009/001870.

Mar. 5, 2010 International Search Report issued in corresponding International Application No. PCT/GB2009/002780.

Mar. 19, 2009 Office Action issued in corresponding Application No. GB0822281.2.

Feb. 23, 2010 Office Action issued in U.S. Appl. No. 12/278,528.

Mar. 11, 2010 Office Action issued in U.S. Appl. No. 12/278,521.

Nov. 18, 2009 Office Action issued in U.S. Appl. No. 11/920,345.

Sep. 14, 2010 Office Action issued in Japanese Patent Application No. 2008-512909 (translation).

Oct. 19, 2010 Office Action issued in U.S. Appl. No. 12/278,500.

Jan. 12, 2011 Office Action issued in U.S. Appl. No. 12/278,528.

M. Bertero & P. Boccacci, "Introduction to Inverse Problems in Imaging," Institute of Physics Publishing, 1998, p. 106-113; 174-183; 288-294.

Japanese Office Action dated May 24, 2011 for Japanese Patent Application No. 2008-512904, (only the "English language version" was provided).

* cited by examiner

Figure 6
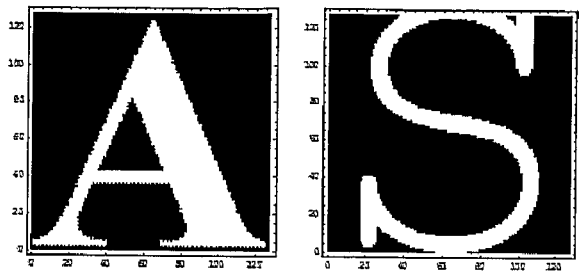
Fig 6a
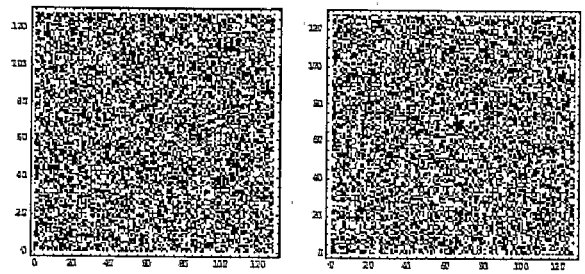
Fig 6b
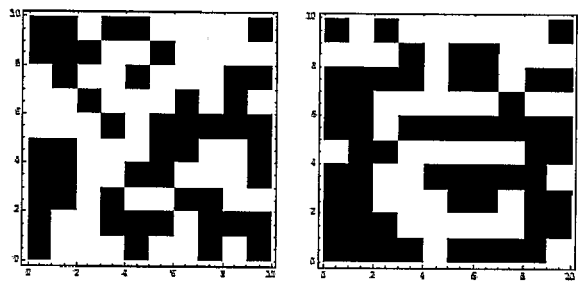
Fig 6c
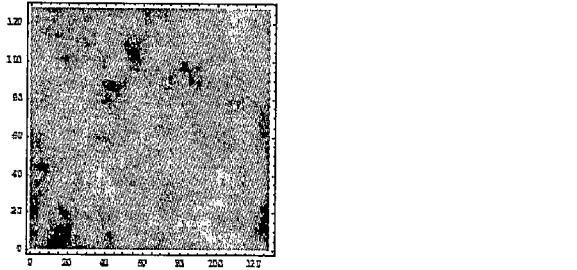
Fig 6d
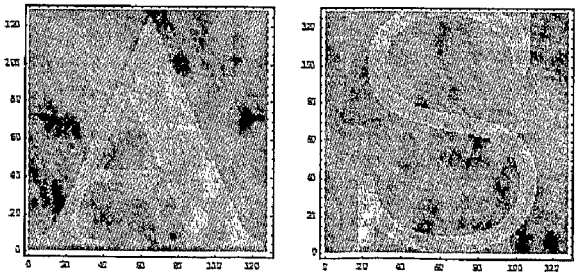
Fig 6e

CODED APERTURE IMAGING SYSTEM

This invention relates to a coded aperture imaging system, especially to a coded aperture imaging system having a reconfigurable coded aperture mask and which can image two separate fields of view simultaneously.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics, Vol. 17, No. 3, pages 337-347, 1 Feb. 1978. It has also been proposed for three dimensional imaging, see for instance "Tomographical imaging using uniformly redundant arrays" Cannon T M, Fenimore EE, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution but increasing the number of apertures increases the radiation arriving at the detector thus increasing the signal to noise ratio. Each aperture passes an image of the scene to the detector array and so the pattern at the detector array is an overlapping series of images and is not recognisable as the scene. Processing is needed to reconstruct the original scene image from the recorded data.

The reconstruction process requires knowledge of the aperture array used and system configuration and the aperture array chosen is often coded to allow subsequent good quality image reconstruction. The processing is performed using a mathematical model of the particular array at a set location.

Recently, see our co-pending UK patent application GB0510470.8, the present inventors have proposed using a reconfigurable coded aperture mask means. The use of a reconfigurable coded aperture mask means allows different coded aperture masks to be displayed at different times. This allows, for example, the direction and FOV of the imaging system to be altered without requiring any moving parts. Further the resolution of the imaging system can also be altered by changing the coded aperture mask displayed on the coded aperture mask means.

The pattern displayed on the coded aperture mask means is referred to herein as a coded aperture mask. At least part of the coded aperture mask is a coded aperture array. That is either the whole pattern displayed on the mask means is a coded aperture array or, as described in more detail below, only part of the pattern is a coded aperture array. The skilled person will be well of aware of the coded aperture arrays that can be displayed. For the avoidance of doubt the term aperture used herein does not imply a physical hole in the mask means but merely an area of the pattern which allows radiation to reach the detector.

As mentioned the reconfigurable mask means can display a variety of coded aperture masks having a variety of coded aperture arrays in different positions on the mask means. Knowledge of the particular array displayed and its location is used in reconstructing the scene image in the same way as for a fixed coded aperture.

GB0510470.8 teaches that the coded aperture mask means is reconfigurable to provide coded aperture masks having different fields of view. In this way the imaging system performance can be altered within a field of regard that can be many times larger without needing any macroscopic moving parts. The different coded aperture masks may be arranged such that only part of the coded aperture mask comprises a coded aperture array and the position of the coded aperture array in the mask defines the field of view. In other words only a portion of the mask means may be used to define a coded aperture array with the rest of the mask blocking radiation from reaching the detector array. Therefore the only radiation from the scene that can reach the detector array is that passing through the coded aperture array and hence the location of the coded aperture array relative to the detector array and the size of the coded aperture array will define the field of view of the system. Moving the position of the coded aperture array within the mask displayed on the mask means will alter the direction from which radiation can reach the detector array and so will alter the direction and size of the field of view. Thus the total size of the mask means defines the field of regard of the system and can be much larger than the size of a coded aperture array written to the reconfigurable mask means but the field of view can be controlled, for instance to provide scanning or to track an object in the scene.

The coded aperture mask means of GB0510470.8 is also reconfigurable to provide coded aperture masks having different resolutions. For instance different coded aperture masks could be displayed having coded aperture arrays with different effective aperture sizes and spacing. The coded aperture mask means may also be reconfigurable to provide coded aperture masks having different coded aperture arrays.

GB0510470.8 therefore teaches a device that is particularly applicable to multifunctional, high resolution imaging in the visible, near infrared, thermal infrared or ultra-violet wavebands, such as might be employed in surveillance.

According to the present invention there a method of coded aperture imaging comprising arranging a detector to receive radiation from a scene via a coded aperture mask wherein the coded aperture mask has a plurality of distinct coded aperture arrays at different locations of the mask.

The present invention therefore provides a method of imaging wherein two or more distinct coded aperture arrays are used simultaneously at different locations. Each coded aperture array will therefore pass radiation from a different part of the scene to the detector. Obviously the intensity pattern at the detector will comprise elements from each coded aperture array. The present inventors have realised that the resultant intensity signal can be processed to reconstruct a scene image associated with each coded aperture array. In other words the present invention provides a method imaging in a plurality of different directions simultaneously, each using the full resolution of the detector.

For some applications, where the separate fields of view required are known and fixed, the coded aperture mask may have a fixed pattern. However the present invention may be advantageously implemented using the reconfigurable coded aperture array means taught by GB0510470.8. The present invention therefore offers a very versatile method of imaging wherein, using the method of the present invention, different fields of view can be viewed simultaneously using the full detector resolution.

The different coded aperture arrays may have different resolutions and/or sizes. For instance one coded aperture array of the coded aperture mask may have a very high resolution and thus provide a detailed view of one part of the scene whereas another coded aperture array has a lower resolution for a different part of the scene.

Each coded aperture array is preferably uncorrelated with the other coded aperture arrays, i.e. there should be no significant peaks in the cross correlation between the individual mask patterns.

With a reconfigurable coded aperture mask means the method may involve periodically changing at least one of the position, size and resolution of at least one coded aperture array provide by the mask means. The changes may be done in a predetermined cyclic manner, for instance for a scanning type application or may be controlled to centre on areas of interest in the scene. For instance particular targets in the scene could be tracked by an operator or by an automated tracking controller. As there are multiple coded aperture arrays provided multiple targets can be tracked at once. The number of coded aperture arrays may also be changed periodically.

As mentioned the intensity pattern at the detector array will be the sum of the intensity pattern from each mask, The signal received at the detector array needs decoding to reconstruct the signal. The decoding can be performed by a number of different methods but in effect each image is decoded separately using information about the particular coded aperture array. The decoding could for instance be performed by a cross correlation, or balanced cross correlation, of the detected intensity with the appropriate coded aperture pattern. A Weiner filtering approach with the decoding terms keyed to the aperture pattern of the appropriate coded aperture could also be used. Deconvolution is not preferred however when using multiple different masks. Therefore the method preferably involves the step of processing the signal at the detector array to decode an image associated with each distinct coded aperture array. The method conveniently involves decoding the signal at the detector array for each distinct coded aperture array using a decoding pattern based on that particular aperture array.

In another aspect of the invention there is provided a coded aperture imager comprising a detector arranged to receive radiation from a scene via a coded aperture mask wherein the coded aperture mask is adapted to provide a plurality of distinct coded aperture array at different locations.

Preferably the coded aperture mask is a reconfigurable coded aperture mask means.

The coded aperture mask may be planar or may be curved. In some applications curved masks may offer better potential fields of view.

Figure 2:
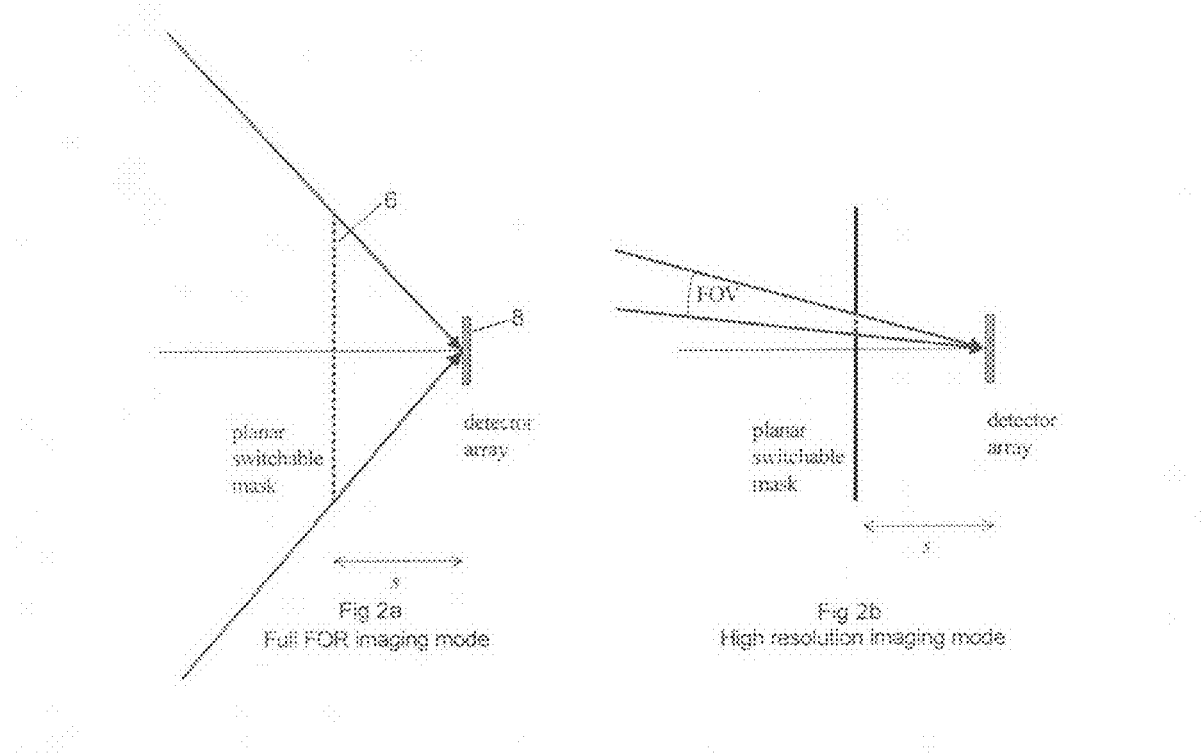
Figure 3:
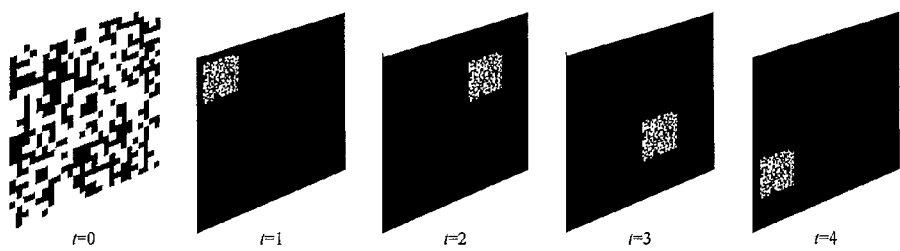
Figure 4:
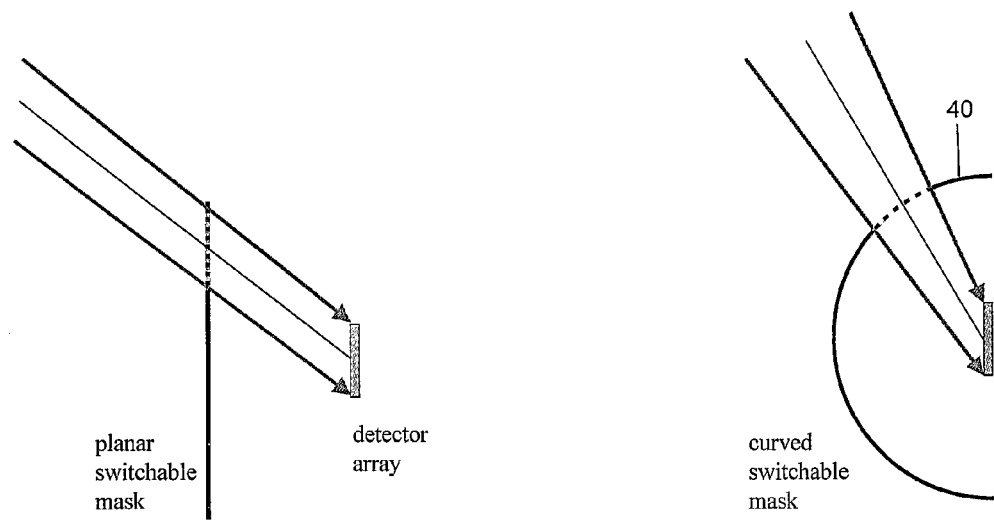
Figure 5:
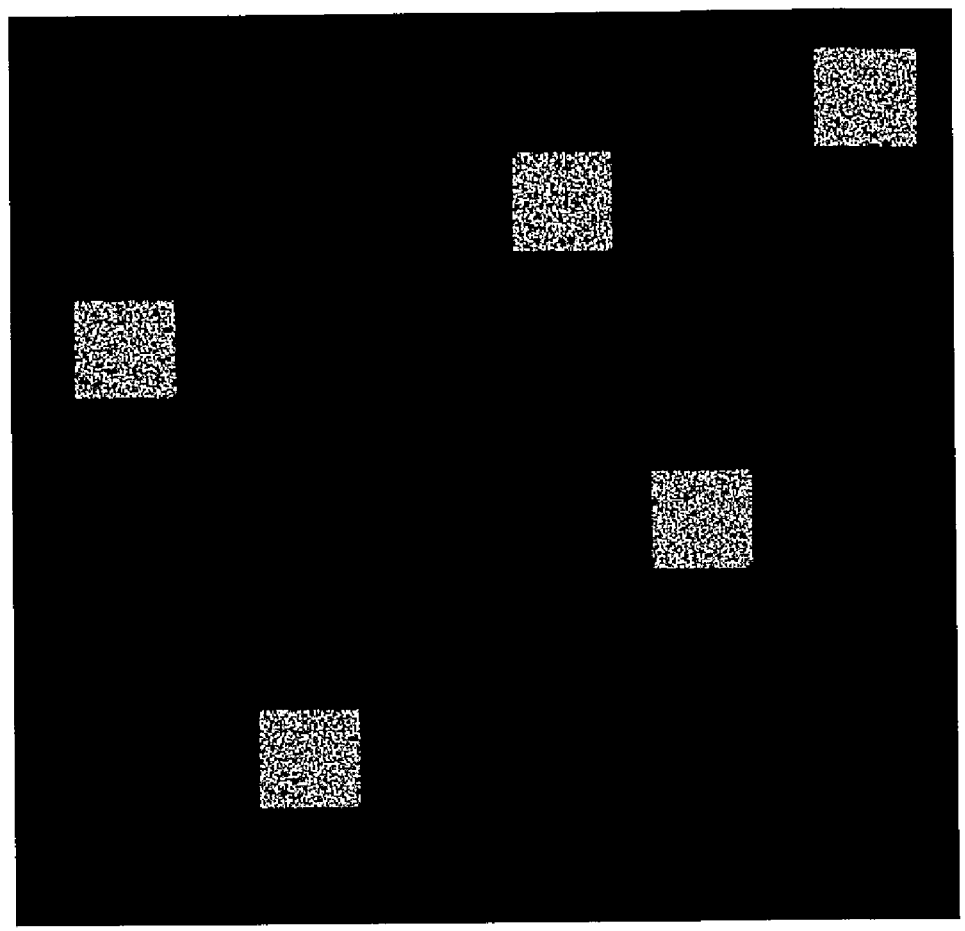

The present invention will now be described by way of example only with respect to the following drawings of which;

FIG. 1 shows schematically a coded aperture imaging system according to the present invention, FIG. 2 shows a simple planar coded aperture mask means operable in two modes; a) a full FOR low resolution imaging mode and b) a high resolution narrow FOV imaging mode, FIG. 3 illustrates some individual mask patterns that may be used at different times, FIG. 4 shows a curved coded aperture mask means, FIG. 5 shows a coded aperture mask having a plurality of distinct coded aperture arrays, and FIG. 6 shows a simulation of two separate targets imaged simultaneously using uncorrelated coded aperture arrays onto the same detector array and the resultant decoded images.

CAI is based on the same principles as a pinhole camera. In a pinhole camera, images free from chromatic aberration are formed at all distances away from the pinhole, allowing the prospect of more compact imaging systems, with a much larger depth of field. However, the major penalty is the poor intensity throughput, which results from the small light gathering characteristics of the pinhole. Nevertheless, the camera is still able to produce images with a resolution determined by the diameter of the pinhole, although diffraction effects have to be considered. The light throughput of the system can be increased by several orders of magnitude, while preserving angular resolution, by using an array of pinholes. Each detector element sees the result of the summation of contributions from the various pinholes, corresponding to each viewpoint of the scene.

Another way of understanding the operating principle of CAI is to observe that this is a purely geometric imaging technique. Light from every point in a scene within the field of regard (FOR) of the system casts a shadow of the coded aperture onto the detector array. The detector measures the intensity sum of these shadows. The coded aperture is specially designed such that its autocorrelation function is sharp with very low sidelobes. Typically pseudorandom or uniformly redundant arrays (URA) (such as described in E. Fenimore and T. M. Cannon, "Coded aperture imaging with uniformly redundant arrays", Applied Optics, Vol. 17, No. 3, pages 337-347, 1 Feb. 1978) are used where a deconvolution of the detector intensity pattern can yield a good approximation to the point distribution in the scene.

FIG. 1 shows schematically an example of coded aperture imaging system, generally indicated 2. Rays of light from points in the scene 4 fall onto a reconfigurable mask means 6 displaying a particular coded aperture array. The coded aperture array acts as a shadow mask and therefore a series of overlapping coded images are produced on the detector array 8. At each pixel on the detector array, the intensities from the overlapping, coded images are summed. The output from the detector array 8 is passed to a processor 10 where image of the scene can be subsequently decoded from the detector signals using a variety of digital signal processing techniques. The coded aperture mask means is controlled by a controller 12 which controls the reconfigurable mask means to display different coded aperture masks.

As shown in FIG. 2 the size and relationship of the reconfigurable mask means 6 to the detector array 8 defines the field of regard of the imaging system. FIG. 2a shows the reconfigurable mask means displaying a coarse coded aperture array across its whole area. The imaging system in FIG. 2a is operating in full field of regard (FOR) imaging mode and generates a relatively low resolution image of the whole FOR. The reconfigurable mask means can then be reconfigured to a high resolution mode shown in FIG. 2b where a small area of the reconfigurable mask displays a finer resolution coded. For simplicity only one such array is shown in FIG. 2.

Radiation can only reach the detector array 8 through the portion of the mask bearing the coded aperture array so only a narrow field of view (FOV) is observed but as the whole detector array receives radiation the resolution of the image is improved. The resolution and FOV of the system can thus be easily varied according to a particular need. For instance, were the imaging system to be used in a security surveillance system it could be operated generally in full FOR low resolution mode to monitor an area. However when needed particular fields of view could be selected for high resolution imaging. For instance, were motion in the image to be detected, either by an operator or automatically using image processing, the mask means could be reconfigured to give a high resolution image of each area in which the motion occurred.

FIG. 5 shows a coded aperture mask bearing a plurality of coded aperture arrays. Each array is distinct and each will pass radiation from the appropriate part of the scene to the detector array 8. Decoding of each of these signals will result a plurality of images being formed simultaneously, each of a different FOV.

It will be apparent that the field of view is determined by the size and location of the coded aperture array displayed on the reconfigurable mask means. Varying the position of a small array on the mask means changes the field of view. Thus the field of view of the imaging system can be easily steered by simply reconfiguring the mask means to alter the position of the coded aperture array. FIG. 3 illustrates a series of mask patterns that could be used with reference to a single mask only for clarity.

At time t=0 the whole mask means is in full FOR surveillance mode with a full size coded aperture array displayed. At time t=1 the system switches to a high resolution tracking and identification mode where only a portion of the mask displays a coded aperture array and the position is moved (t=2, 3 etc.) to track an object in the scene.

The present invention therefore provides a system with a rapidly reconfigurable coded mask, of sufficient extent to allow radiation from a large FOR to selectively fall on the detector array. A planar mask means, or a curved one, can be used. FIG. 4 shows an example of a curved mask means 40. As with the planar mask means a curved mask means but display different coded aperture arrays to provide different resolutions and can vary the position of the coded aperture arrays on the mask means to alter the FOV. However a curved mask means has the advantage of further increasing the FOR for a given system aperture, although is more difficult to fabricate. The mask means could also be faceted, i.e. could have a series of planar facets arranged at angles to each other. A faceted mask means may be simpler that a curved mask means in some respect, especially if each field of view was generally wholly contained within a facet, and a faceted mask means may be easier to construct than a curved mask means.

A variety of CAI decoding algorithms already available in the prior art, the majority of which have been developed for off line decoding involving the relatively low pixel count detectors associated with X-ray, g-ray and radiological imaging and some of these techniques can be applied to decoding the image associated with each different coded aperture array.

In the most general case, the signal on the detector array D from two masks can be described by:

$$D(x,y)=(S_1(x,y) \otimes A_1(x,y)+S_2(x,y) \otimes A_2(x,y))+N(x,y) \quad (1)$$

where x,y are the lateral coordinates of the two dimensional signal distribution, $S_1$ is the signal received from the scene through mask 1, $A_1$ is the aperture function of mask 1, $S_2$ is the signal received from the scene through mask 2 and $A_2$ is the aperture function of mask 2. N is the noise introduced at the detector and $\otimes$ is the convolution operator. The object of all such decoding algorithms is to recover part of, or the whole of, $S(x,y)$ with as few artifacts as possible.

For the present invention the signal at the detector array will actually be the sum of all the intensity patterns contributed by each of the coded aperture array. However the processing the signal based on the aperture pattern for any one of the arrays will reveal just the image as seen by that array. Thus the image associated with each separate field of view can be recovered.

Cross-correlation Methods

In this technique, each signal $S(x,y)$ is decoded by correlating $D(x,y)$ with an array $G(x,y)$ $$S_1'(x,y)=D(x,y) \oplus G_1(x,y)=(S_1(x,y) \otimes A_1(x,y) \oplus G_1(x,y) + S_2(x,y) \otimes A_2(x,y) \oplus G_1(x,y))+N(x,y) \oplus G_1(x,y) \quad (2)$$

and $$S_2'(x,y)=D(x,y) \oplus G_2(x,y)=(S_1(x,y) \otimes A_1(x,y) \oplus G_2(x,y) + S_2(x,y) \otimes A_2(x,y) \oplus G_2(x,y))+N(x,y) \oplus G_2(x,y) \quad (3)$$

where $\oplus$ is a correlation and $S'_1$ and $S'_2$ are approximations to the signals.

In the simple case of $G_1=A_1$ and $G_2=A_2$, and the mask designs are such that there are uncorrelated but each with an auto correlation that approximates well to a delta function, with small sidelobes. Uniform redundant arrays were developed to achieve this with small array dimensions. If this is the case, then a reasonable quality reconstruction can be achieved. However, the real positive nature of the mask functions will result in a pedestal of 0.5 times the peak value of the autocorrelation, even in the ideal case, with associated decrease in reconstruction quality compared to the ideal case deconvolution algorithm. More generally, G is chosen such that G≠A. In this case appropriate choice of G can result in good quality reconstructions. Balanced cross correlation is an example of one such approach.

A Fourier based implementation can be computationally efficient. A closely related approach is Wiener filtering, where a weighted cross correlation is used. This approach is useful for masks which have poor autocorrelation functions.

FIG. 6 shows the results a numerical simulation of the decoding process. FIG. 6a shows two different targets which represent separate parts of the scene that are separately imaged by distinct coded aperture arrays at different parts of a coded aperture mask means. FIG. 6b shows the two uncorrelated coded aperture arrays and FIG. 6c shows a close up section of the bottom left hand corner of each array and exhibits the uncorrelated nature of the two array patterns.

FIG. 6d is a simulation of the actual intensity pattern that would be recorded on the detector array using each of the coded aperture arrays shown to simultaneously image one of the targets. Finally 6e shows the decoded images that would result using a cross correlation algorithm. The quality of the decoded image is low as the simulation is relatively crude and the coded aperture arrays and decoding algorithms have not been optimised. However it can clearly be seen that the separate images can be decoded from the single intensity pattern on the detector array.

The invention claimed is:

1. A method of coded aperture imaging, comprising:
   arranging a single detector to receive radiation from a scene via a single coded aperture mask, the coded aperture mask having a plurality of separate and distinct coded aperture arrays at different locations of the single coded aperture mask;
   periodically changing at least one of a location, size and resolution of at least one of the coded aperture arrays;
   detecting the radiation from the scene received simultaneously at the detector by the plurality of coded aperture arrays; and
   processing a signal representing the radiation received at the detector to decode an image associated with each of the separate and distinct coded aperture arrays.

2. A method as claimed in claim 1 wherein the single coded aperture mask is provided as a reconfigurable coded aperture mask device.

3. A method as claimed in claim 1 wherein at least one of the coded aperture arrays has a different resolution than another one of the coded aperture arrays.

4. A method as claimed in claim 1 wherein at least one of the coded aperture arrays has a different size than another one of the coded aperture arrays.

5. A method as claimed in claim 1 wherein each of the plurality of coded aperture arrays is uncorrelated with the other coded aperture arrays.

6. A method as claimed in claim 1 wherein the plurality of coded aperture arrays are orthogonal.

7. A method as claimed in claim 1 further comprising periodically changing a number of the coded aperture arrays.

8. A coded aperture imager comprising:
   a single detector; and
   a single coded aperture mask wherein the single coded aperture mask is adapted to provide a plurality of separate and distinct coded aperture arrays at different locations of the single coded aperture mask, and to periodically change at least one of a location, size and resolution of at least one of the coded aperture arrays, and
   the detector is arranged to receive radiation from a scene via the single coded aperture mask.

9. A coded aperture imager as claimed in claim 8 wherein the single coded aperture mask is a reconfigurable coded aperture mask device.

10. A coded aperture imager as claimed in claim 8 wherein the single coded aperture mask is curved.

11. A coded aperture imager as claimed in claim 8 wherein the single coded aperture mask is faceted.

* * * * *